May 13, 1930.                J. W. LEDOUX                 1,757,968
                             FLUID METER
                          Filed Dec. 5, 1921
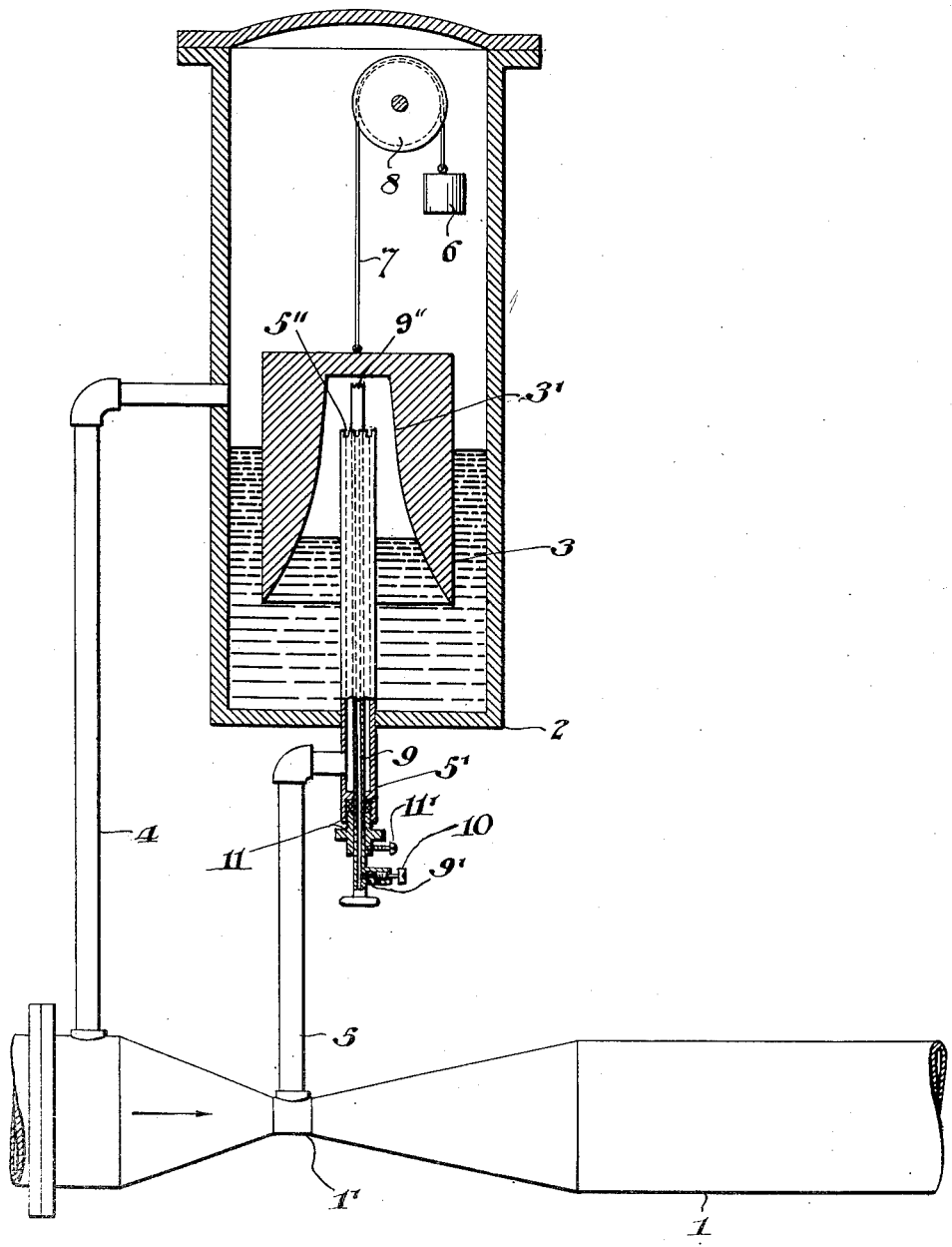
Inventor:
John W. Ledoux,
By Butler & Denny
    Attorneys.

Patented May 13, 1930

1,757,968

UNITED STATES PATENT OFFICE

JOHN W. LEDOUX, OF SWARTHMORE, PENNSYLVANIA, ASSIGNOR, BY MESNE ASSIGNMENTS, TO SIMPLEX VALVE & METER COMPANY, OF PHILADELPHIA, PENNSYLVANIA, A CORPORATION OF DELAWARE

FLUID METER

Application filed December 5, 1921. Serial No. 519,970.

This invention relates to fluid or liquid meters in which a sealed bell or hollow float is movable with variations in the flow to be measured by differential pressures communicated to the interior and exterior thereof from such fluid.

The primary object of the invention is to provide simple means for removing the air from such bells or hollow floats and analogous devices and avoiding the irregularities in the operation of the meter resulting from the presence of trapped air.

The invention is characterized, in its preferred construction, by placing a pipe provided with a valve in the conduit connecting the fluid or liquid to be measured with the interior of the float and providing means for permitting such pipe to be moved longitudinally so that all or substantially all the air trapped in the float can be discharge therefrom through the pipe upon opening the valve.

The accompanying drawing is a part sectional elevation of apparatus embodying the invention.

The invention, in the form thereof illustrated in the drawing, is applied to a meter connected with a conduit 1 having a contracted section 1'. The meter comprises the case 2 containing a bell or inverted hollow float 3 sealed by a liquid heavier than that to be measured and the conduits 4 and 5 connecting respectively a normal section and the contracted section of the conduit 1 with the interior of the case, without and within the float; the float being counterbalanced by a weight 6 connected therewith by a tension member 7 which passes over the revoluble sheave 8.

In accordance with my improvements, the pipe 5 is provided with an offset section 5' which extends through the bottom of the case and the sealing liquid therein into the float chamber 3', the top of this section being provided with means as the notches 5'' for preventing it from being sealed by the engagement of the float therewith and preventing the float from being held thereby.

A pipe 9, having a vent 9' controlled by a valve 10, is placed in the pipe section 5', and is movable longitudinally through the the stuffing box 11 fixed to the bottom thereof, a set screw 11' fixing the pipe in the desired position. Thereby the pipe 9, which is provided with the shallow top notches 9'', can be adjusted longitudinally to bring its top into contact with the top of the chamber 3' and all the air in the chamber can then be expelled therefrom upon opening the valve 10. The air being expelled from the chamber 3', the valve 10 is closed and the pipe 9 is drawn down and set in a position which will permit the float to reciprocate freely without making contact therewith.

It will be understood that in operation the top of the conduit 5' is below the lower limit reached by the top of the chamber 3'.

Having described my invention, I claim:

1. A fluid meter comprising a casing containing a hollow device and a sealing medium, said casing and device being relatively movable, differential pressure mechanism connected with said casing and with said device respectively, an exhaust conduit connecting the interior of said device with the atmosphere while said device is connected with said differential pressure mechanism, and means for controlling said exhaust conduit.

2. A fluid meter comprising a casing containing a sealing medium and a hollow device having a closed upper part and an open lower part adapted to be immersed in said medium, differential pressure mechanism connected with said casing and device, and means comprising a pipe longitudinally adjustable with respect to said casing and for exhausting air from said device during the connection thereof with said differential pressure mechanism.

3. A liquid meter having, in combination with a case containing a liquid heaver than that to be measured, a hollow float having a closed upper portion and an open lower portion; sealed by said liquid, means for communicating different pressures from the liquid to be measured to the interior of said case and respectively within and without said float, and a valved pipe extending through said seal into said float for discharging air therefrom independently of said means.

4. A liquid meter having, in combination with a case containing a liquid heavier than that to be measured, a hollow float having its upper part closed and its lower part open and sealed by said liquid, conduits for communicating different pressures from the liquid to be measured to the interior of said case and respectively within and without said float, a valved pipe extending through a section of the conduit communicating with the interior of said float and a stuffing box through which said pipe is adjustable.

5. A liquid meter having, in combination with a case containing a sealing fluid and a float having a chamber therein sealed by said fluid and a pressure conduit extending through said case into said chamber, a pipe connecting said chamber with the atmosphere and a valve for controlling the passage through said pipe, said pipe being adjustable into contact with the top of said chamber and having means for preventing it from being sealed by said chamber.

6. A liquid meter comprising a casing containing a hollow device and a liquid sealing medium, said casing and device being relatively movable, differential pressure mechanism connected with said casing and with said device respectively, an exhaust conduit connecting the interior of said device with the atmosphere while said device is connected with said differential pressure mechanism, and means for controlling said exhaust conduit.

7. A liquid meter comprising a casing containing a liquid medium and a hollow device having a closed upper part and an open lower part adapted to be immersed in said medium, differential pressure mechanism connected with said casing and device, and means comprising a pipe longitudinally adjustable with respect to said casing and for exhausting air from said device during the connection thereof with said differential pressure mechanism.

8. A liquid meter having, in combination with a case containing a sealing liquid and a float having a chamber therein sealed by said liquid and a pressure conduit extending through said case into said chamber, a pipe connecting said chamber with the atmosphere and a valve for controlling the passage through said pipe, said pipe being adjustable into contact with the top of said chamber and having means for preventing it from being sealed by said chamber.

Signed at Philadelphia, in the county of Philadelphia and State of Pennsylvania, this third day of December, 1921.

JOHN W. LEDOUX.